(12) United States Patent
Dent

(10) Patent No.: US 10,598,162 B2
(45) Date of Patent: Mar. 24, 2020

(54) PUMP AND A DESALINATION SYSTEM INCLUDING THE PUMP

(71) Applicant: KATADYN DESALINATION, LLC, Petaluma, CA (US)

(72) Inventor: Christopher John Dent, Riverhead (NZ)

(73) Assignee: KATADYN DESALINATION, LLC, Petaluma, CA (US)

( * ) Notice: Subject to any disclaimer, the term of this patent is extended or adjusted under 35 U.S.C. 154(b) by 399 days.

(21) Appl. No.: 15/298,257

(22) Filed: Oct. 20, 2016

(65) Prior Publication Data
US 2018/0112653 A1 Apr. 26, 2018

(51) Int. Cl.
*F04B 1/16* (2006.01)
*F04B 1/14* (2020.01)
(Continued)

(52) U.S. Cl.
CPC ........... *F04B 1/16* (2013.01); *C02F 1/441* (2013.01); *F04B 1/0408* (2013.01); *F04B 1/0421* (2013.01); *F04B 1/0452* (2013.01); *F04B 1/053* (2013.01); *F04B 1/0538* (2013.01); *F04B 1/124* (2013.01); *F04B 1/143* (2013.01); *F04B 5/02* (2013.01); *F04B 7/0011* (2013.01); *F04B 9/045* (2013.01); *F04B 53/006* (2013.01);
(Continued)

(58) Field of Classification Search
CPC ........ F04B 1/16; F04B 1/0408; F04B 1/0421; F04B 1/0452; F04B 1/053; F04B 1/0538; F04B 1/124; F04B 1/143; F04B 5/02; F04B 7/0011; F04B 9/045; F04B 53/006; F04B 53/10; F04B 53/1092; F04B 53/144; C02F 1/441; C02F 1/001; C02F 2103/08; B01D 61/06; B01D 61/04
USPC ............................................... 417/273
See application file for complete search history.

(56) References Cited

U.S. PATENT DOCUMENTS 4,434,056 A * 2/1984 Keefer .................. B01D 61/06
210/637
4,556,371 A * 12/1985 Post .................... F04B 11/0066
417/539

(Continued)

FOREIGN PATENT DOCUMENTS

WO 1997046803 A1 12/1997

*Primary Examiner* — Dominick L Plakkoottam
*Assistant Examiner* — Connor J Tremarche
(74) *Attorney, Agent, or Firm* — Stinson LLP

(57) ABSTRACT

A pump in desalination systems has four cylinders, each having a double acting piston. Each cylinder and piston defines a feed chamber and a recovery chamber. The pistons connect to a common drive. The connection to the common drive is such that the pistons reciprocate in a sequence equally spaced in time. Reciprocating valving for each piston is driven by the common drive to be 90 degrees out of phase with the respective piston. The valving connects the recovery chamber alternately to an inlet manifold for an intake stroke of the piston relative to the recovery chamber, and to an outlet manifold for a discharge stroke of the piston relative to the recovery chamber. A brief period of closure coincides with top dead centre and bottom dead centre of the piston, during which the recovery chamber is blocked off from both the inlet and outlet manifolds. The reciprocating valving is midway between its top dead centre and bottom dead centre during the period of closure.

19 Claims, 3 Drawing Sheets

(51) Int. Cl.

| | | |
|---|---|---|
| *F04B 1/12* | (2020.01) | |
| *F04B 53/00* | (2006.01) | |
| *F04B 53/10* | (2006.01) | |
| *F04B 53/14* | (2006.01) | |
| *C02F 1/44* | (2006.01) | |
| *C02F 1/00* | (2006.01) | |
| *F04B 1/143* | (2020.01) | |
| *F04B 1/124* | (2020.01) | |
| *F04B 1/053* | (2020.01) | |
| *F04B 1/0538* | (2020.01) | |
| *F04B 9/04* | (2006.01) | |
| *F04B 7/00* | (2006.01) | |
| *F04B 5/02* | (2006.01) | |
| *F04B 1/0452* | (2020.01) | |
| *F04B 1/0408* | (2020.01) | |
| *F04B 1/0421* | (2020.01) | |
| *C02F 103/08* | (2006.01) | |

(52) U.S. Cl.
CPC .......... *F04B 53/10* (2013.01); *F04B 53/1092* (2013.01); *F04B 53/144* (2013.01); *C02F 1/001* (2013.01); *C02F 2103/08* (2013.01); *Y02A 20/131* (2018.01)

(56) References Cited

U.S. PATENT DOCUMENTS

| | | | | |
|---|---|---|---|---|
| 6,558,537 | B1 * | 5/2003 | Herrington | B01D 61/04 210/192 |
| 2012/0272764 | A1 * | 11/2012 | Pendleton | F04B 9/02 74/414 |
| 2015/0050167 | A1 * | 2/2015 | Hirosawa | B01D 61/06 417/406 |

* cited by examiner

PUMP AND A DESALINATION SYSTEM INCLUDING THE PUMP

BACKGROUND

The present invention relates to pumps, particularly for membrane filtration systems such as desalination systems, and to such systems including the pumps.

In a typical desalination system using a reverse osmosis membrane, a saline solution is supplied to a membrane unit at high pressure, for example between 650 and 950 Psi (4500 to 6500 kPa). After passing through the saline side of the membrane unit the volume of solution is reduced and the salinity is increased—with a portion of the fresh water extracted through the membrane. This exhaust liquid or concentrate is still at a high pressure.

The saline solution for feeding to the membrane unit is pressurised by a feed pump.

In some systems the feed pump may have a single cylinder, and may be manually operated by a lever.

In larger systems the feed pump may be mechanically driven, for example by an electric motor, and have multiple cylinders.

U.S. Pat. No. 4,434,056 describes two examples of a feed pump which includes energy recovery. The first example has 3 cylinders. The second example has 5 cylinders. In both examples the valving for energy recovery from the exhaust liquid is integrally provided as a spool valve arrangement on the piston rods. The valving for each cylinder is provided on the piston rod of another cylinder. Both examples include complex pistons with integrated lost motion mechanisms to provide a dwell time at each end of the piston rod stroke. This dwell time accommodates the angular period for which the valving for the respective piston is closed.

The inclusion of a lost motion mechanism in the piston has several problems. The mechanism is complex and has parts which collide in use, necessitating buffers. In addition operation of the dwell mechanism can be adversely effected by pre-pressurised supply of the feed liquid, as the dwell effect needs a negative pressure on the supply side of the piston.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

For the purpose of this specification, where method steps are described in sequence, the sequence does not necessarily mean that the steps are to be chronologically ordered in that sequence, unless there is no other logical manner of interpreting the sequence.

SUMMARY OF THE INVENTION

It is an object of the present invention to provide a pump, or a desalination system, which goes some way toward overcoming the above disadvantages or which will at least provide the public or the industry with a useful choice.

In a first aspect the present invention may broadly be said to be a pump comprising:
   four cylinders,
   a double acting piston in each cylinder, thereby defining a feed chamber and a recovery chamber, all connected to a common drive,
   the connection to the common drive being such that the pistons reciprocate in a sequence equally spaced in time,
   reciprocating valving for each piston driven by the common drive to be 90 degrees out of phase with the respective piston,
   the valving being such as to connect the recovery chamber alternately to an inlet manifold for an intake stroke of the piston relative to the recovery chamber, and to an outlet manifold for a discharge stroke of the piston relative to the recovery chamber, with a brief period of closure coinciding with top dead centre and bottom dead centre of the piston, during which the recovery chamber is blocked off from both the inlet and outlet manifolds,
   the reciprocating valving being midway between its top dead centre and bottom dead centre during the period of closure.

In one embodiment, there is no lost motion mechanism associated with each piston.

In one embodiment, the connection includes a piston rod extending from each piston and reciprocating with the respective piston, and the valving for each cylinder is operated by the reciprocating of the piston rod of another cylinder.

In one embodiment, the connection includes a crankshaft and a connecting rod connecting between each piston rod and the crankshaft.

In one embodiment, the valving for each cylinder comprises a spool or shuttle valve formed on the piston rod, cooperating with ports for each of the inlet manifold, the outlet manifold and the recovery chamber, to be in one of three conditions: connecting the inlet manifold port to the recovery chamber port, closing all three ports from one another, and connecting the outlet manifold port to the recovery chamber port.

In one embodiment, the inlet manifold ports are between the recovery chamber ports and the recovery chamber, and the reciprocation of each piston lags by 90 degrees the reciprocation of the piston rod which carries the valving for the aforesaid piston.

In one embodiment, the cylinders, pistons and valving are formed from plastics materials.

In a second aspect the present invention may be said to broadly consist in a desalination system for desalinating sea water, the system including a supply pump drawing a supply of raw sea water, a filter receiving raw feed water from the supply pump, a feed pump as claimed in any one of claims 1 to 10 receiving filtered sea water from the filter, a membrane unit receiving filtered sea water at high pressure from the feed pump, and discharging fresh water at one outlet and a high pressure concentrate at another outlet, the feed pump receiving the high pressure concentrate, applying energy from the high pressure concentrate to pumping the filtered sea water, and discharging lower pressure concentrate.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification and claims means "consisting at least in part of". When interpreting statements in this specification and claims which include that term, the features, prefaced by that term in each statement, all need to be present but other features can also be present. Related terms such as "comprise" and "comprised" are to be interpreted in the same manner.

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.)

BRIEF DESCRIPTION OF THE DRAWINGS

The invention will now be described by way of example only and with reference to the drawings.

DETAILED DESCRIPTION OF THE INVENTION

Figure 1:
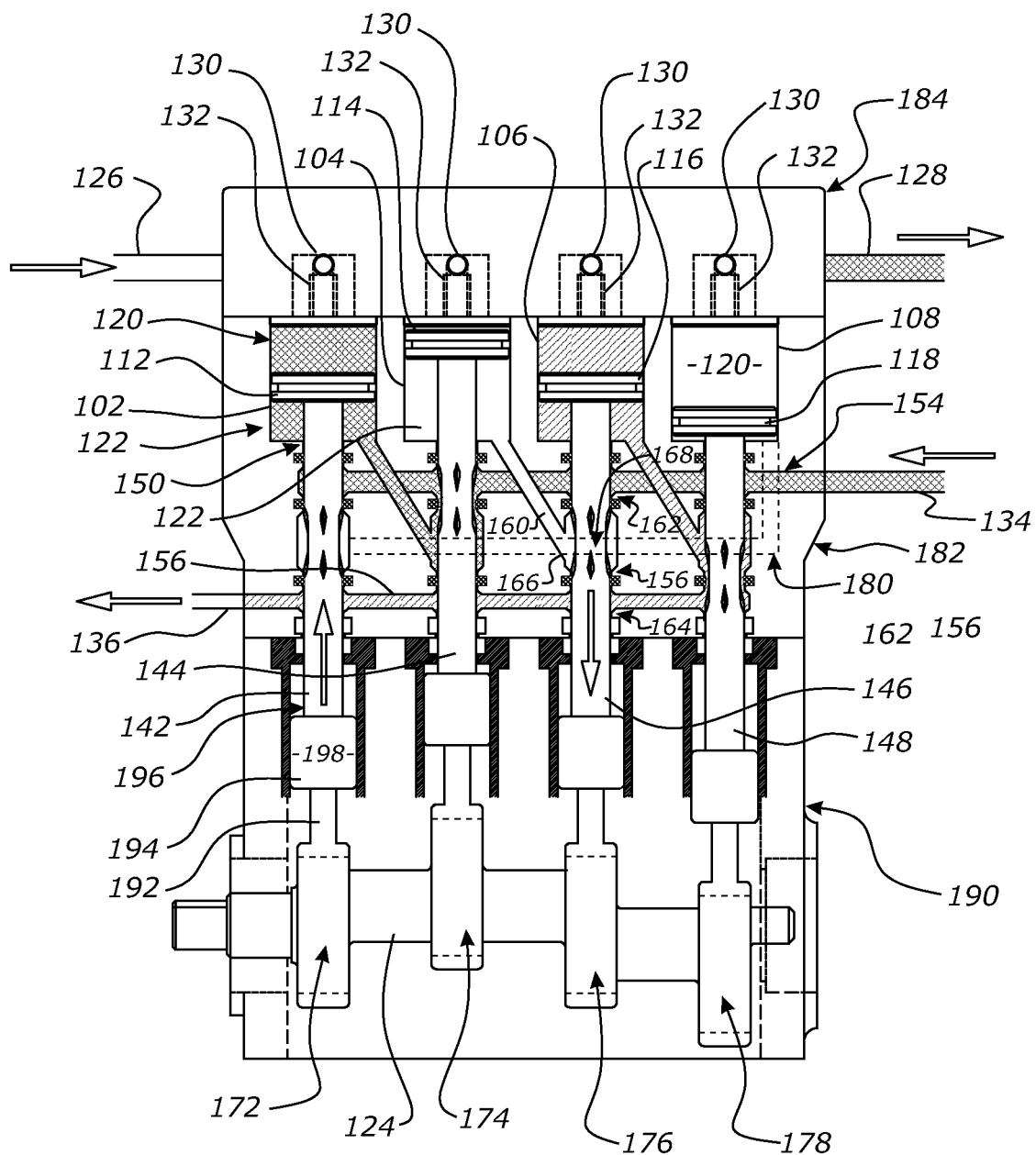
FIG. 1 is a cross section of a feed pump for a desalination system.

A feed pump suited to use in a desalination system is illustrated in FIG. 1.

The feed pump includes four cylinders labelled 102, 104, 106 and 108. Each cylinder includes a double acting piston 112, 114, 116 and 118 respectively. The piston divides the cylinder into two chambers—a feed chamber 120 and a recovery chamber 122.

The pistons are connected to a common drive system. In the illustrated embodiment the drive system comprises a crankshaft 124. Connection of the pistons to the crankshaft is arranged so that reciprocation of the pistons is equally spaced in time. They may be described as being spaced at 90 degree intervals. In each revolution of the crankshaft each piston makes one cycle. In particular, moving from a position furthest from the crankshaft axis (commonly called top dead centre or TDC), the piston moves toward the crankshaft to eventually reach its location closest to the crankshaft (commonly called bottom dead centre or BDC) before moving away from the crankshaft to TDC. In FIG. 1 piston 114 of the second cylinder 104 is at TDC, and piston 118 of fourth cylinder 108 is at BDC.

Valving is provided for each cylinder to connect the feed chamber 120 of the cylinder alternately to an inlet 126 supplied with a low pressure source of feed water substantially throughout the stroke from TDC to BDC, and to an outlet 128 to supply highly pressurised water to a membrane unit substantially throughout the stroke from BDC to TDC. Each cylinder is connected to the inlet 126 by an inlet port from a common inlet manifold or rail, and to the outlet by an outlet port to a common outlet manifold or rail. The valving for the feed chamber may take the form of simple one-way (or check) non-return valves in each inlet and outlet port, for example non-return valve 130 in outlet port 132.

Recovery valving is also provided to connect each recovery chamber 122 alternately to a high pressure return 134 from the membrane unit substantially throughout the stroke from BDC to TDC, and to an outlet 136 substantially throughout the stroke from TDC to BDC.

In this way, during each stroke of a piston from BDC to TDC, the high pressure liquid returned from the membrane acts against the side of the piston facing the recovery chamber 122 while the other side of the piston acts to pressurise the feed liquid in feed chamber 120. Then, during the stroke from TDC to BDC, the liquid in the recovery chamber 122 is expelled to the outlet 136 at low pressure, and a fresh charge of feed water is drawn into (or let into) the feed chamber 120 from the low pressure supply 126.

The recovery valving is arranged to be directly driven by the common drive system.

In the illustrated embodiment the recovery valving is performed in conjunction with the movement of the pistons. In particular the valving for each cylinder is tied to the piston movement in another cylinder, that piston movement being 90 degrees out of phase with the piston movement in the first cylinder.

In the illustrated embodiment the drive system for each piston 112, 114, 116 and 118 includes a respective piston rod 142, 144, 146, 148, that reciprocates with the piston, and is connected in sequence between the piston and the crankshaft 124. The piston rod reciprocates in a bore or journal 150, narrower than the cylinder bore within which the piston reciprocates. The journal, the piston rod, or both include porting and seals to define two spaced apart valves. For each cylinder the two valves include a first valve acting between a high pressure return manifold 154 and the respective recovery chamber 122, and a second valve acting between the recovery chamber 122 and a low pressure outlet manifold 156.

Figure 3:
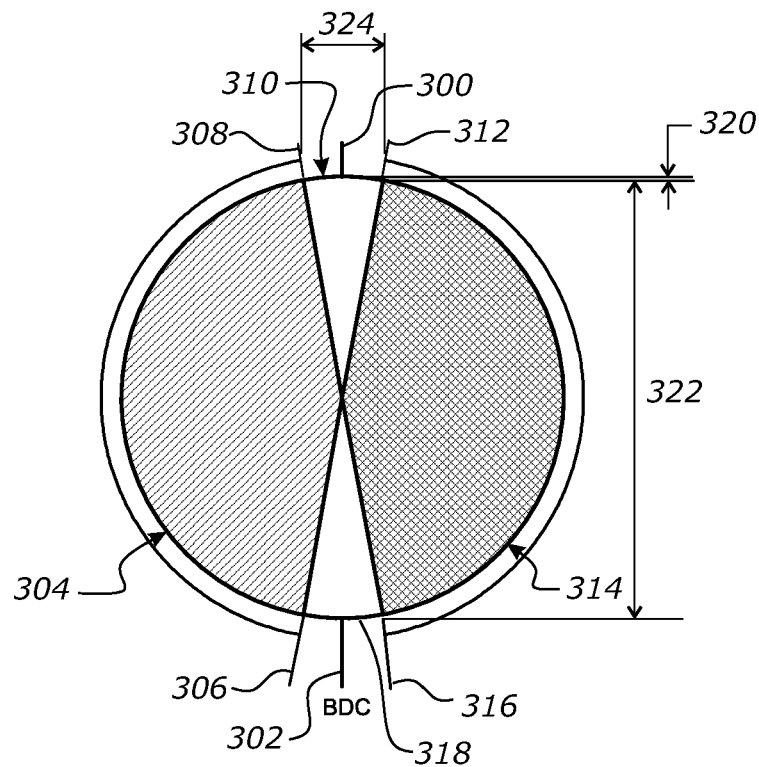
FIG. 3 is a diagram showing timing of valve opening and closing events for a single cylinder of the pump of FIG. 1.

In each reciprocal cycle of a piston rod, the valves are open and closed in sequence best indicated in FIG. 3. This Figure represents one full cycle of valve opening and closing for the recovery chamber of one cylinder. The angular position on the diagram represents the angular position of the crankshaft as it relates to the particular cylinder. The angular position of the crankshaft as it relates to the piston rod carrying the valving is 90 degrees offset from this. TDC for the piston (and the crankshaft) is indicated by mark 300. BDC is indicated by mark 302. The angular position progresses in the clockwise direction at an essentially constant angular velocity. Indicated by portion 304, one valve is open for between 155 and 165 degrees, from mark 306 to mark 308, then both valves are closed at 310 for between 20 and 40 degrees from mark 308 to mark 312. The other valve is then open during period 314 for between 155 and 165 degrees from mark 312 to mark 316. Then both valves are closed for between 20 and 40 degrees from mark 316 to mark 312. The periods in which both valves are closed are at TDC and BDC for the cylinder.

There is a 90 degree phase difference between each piston and its corresponding valving on the piston shaft of another piston. So the period in which both valves are closed occurs when the piston is at or very close to TDC or BDC, (but while the piston rod with the valving is midway between TDC and BDC). While this closed off period 310 or 318 may be as much as 16 degrees (for example 8 degrees either side of TDC or BDC) in some embodiments, as indicated by dimension 320 this would represent less than 1% of the full stroke displacement 322 of the piston. This piston movement is against an essentially incompressible liquid, but is small enough to be accommodated by seal compression and a small amount of leakage. Whereas, being at the mid-point of the stroke of the piston rod, as indicated by dimension 324, this closed period represents 13% of the full stroke of the piston rod—giving plenty of scope for effective sealing of one valve before the other valve opens.

In the illustrated embodiment both valves are implemented by a spool arrangement on the piston rod. With reference to the second cylinder 104 and third piston rod 146 of FIG. 1, a recovery chamber passage 160 leads from a mid location along the piston rod journal 156 to the recovery chamber 122 of the cylinder 104. A high pressure return manifold passage 154 leads to a first location 162 along the piston rod journal spaced from the mid location. An outlet manifold passage 156 leads to a second location 164 spaced from the mid location. The outlet port location 164 and the high pressure return port location 162 are separated along the piston rod journal by the recovery chamber passage port 166. The piston rod 146 is shaped to have a region 168 that can form a flow path, either taken alone or in conjunction with the journal, when the region is brought into alignment with two of the ports (for example to connect across ports 162 and 166 or across ports 166 and 164).

So, in the illustrated example, the piston rod includes a region of reduced radius, or of longitudinal grooves on the outer surface. When this region overlaps both the recovery chamber passage and one other passage, the two are connected—the respective valve is considered open. When this region only overlaps the recovery chamber passage, the passages are all isolated, and both valves are closed.

The lengths of each region or port (162, 164, 166), the nature of the porting of the passages into the piston rod journal, the sealing of the different portions of the piston rod journal to isolate the regions (except when brought into communication by the piston rod shape), and the shape of the piston rod, may be modified in ways known in the art relating to spool valves. For example the flow path may be formed between the piston rod and the journal wall, or may be formed by conduits within the piston rod. The seals may be any suitable sliding seal. One example is a resilient seal seated in a suitably located annular channel. The resilient seal may include independent sliding and urging elements. For example the seal may include a ring of plastics material (such as a thin band of ultra-high-molecular-weight polyethylene) arranged to slide on the inward facing surface of the cylinder or journal, and an o-ring seated in the channel to provide radial pressure against the inside of the ring.

In the illustrated embodiment, the passages and drive are arranged such that a piston lags its valving by 90 degrees, and the high pressure return passage is located along the piston rod journal between the recovery chamber and the recovery chamber passage. So when the piston is travelling from BDC to TDC, the piston rod that provides its valving is in the upper half and the recovery chamber passage is open to the high pressure return passage. When the piston reaches TDC the piston rod that provides its valving is centrally located in its travel from TDC to BDC, and the valve is closed. When the piston is travelling from TDC to BDC the piston rod that provides its valving is in the lower quadrant and the recovery chamber passage is open to the outlet passage. When the piston reaches BDC piston rod that provides its valving is centrally located in its travel from BDC to TDC and the valve is closed.

The passages and drive could alternatively be arranged such that a piston leads its valving by 90 degrees, with the low pressure outlet passage located along the piston rod journal between the recovery chamber and the recovery chamber passage. Alternatively, the passages and drive may be arranged differently for different groups of pistons, such that for one group of pistons the pistons lead their valving by 90 degrees, and for another group of pistons the pistons trail their valving by 90 degrees.

Figure 2:
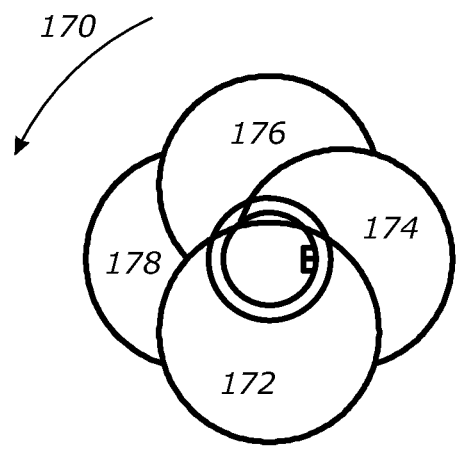
FIG. 2 is a schematic end elevation showing eccentrics on the drive shaft of the pump of FIG. 1.

In the illustrated embodiment the cylinders are arranged in line. The recovery chamber of the first cylinder communicating with the valving of the piston rod of the second cylinder. The recovery chamber of the second cylinder communicates with the valving of the piston rod of the third cylinder. The recovery chamber of the third cylinder communicates with the valving of the piston rod of the fourth cylinder. The recovery chamber passage for each of these cylinders is nicely direct. The recovery chamber of the fourth cylinder communicates with the valving of the piston rod of the first cylinder. This passage is necessarily longer, and may be provided by conduits external to the valve block, or by a longer passage (illustrated in broken lines 180 in FIG. 1) through the block. The common drive is arranges so that the first piston lags the second piston by 90 degrees, the second piston lags the third piston by 90 degrees, the third piston lags the fourth piston by 90 degrees and the fourth piston lags the first piston by 90 degrees. This is best illustrated by the diagram of FIG. 2, which shows the crank shaft, intended to rotate in the direction of arrow 170, with eccentrics 172, 174, 176, 178 corresponding with pistons 112, 114, 116 and 118.

Referring to FIG. 1, in the illustrated embodiment the pump includes a crank case 190 housing crankshaft 124 with an eccentric for driving each piston. An end view of the crankshaft is provided in FIG. 2. A connecting rod 192 connects between each eccentric or crank and a sliding bearing 194. The sliding bearing takes up side loads from the connecting rod, and transfers the reciprocating linear movement to the distal end 196 of the piston rod through a knuckle 198. Each piston rod 142-148 passes out of the crankcase into the piston rod journal formed in a valve block 182. At the other side of the valve block the piston exits the journal into the cylinders. The cylinders are closed by a cylinder head 184 which carries the non-return valves, inlet manifold and high pressure supply manifold.

The division between the cylinder block, the head, the valve block and the crank case may be made at locations different to the illustrated embodiment. The illustrated embodiment serves to show how these may be formed in multiple layers to facilitate manufacture. The layers subsequently secured together by tie rods or bolts or other suitable clamping, fastening or bonding.

For the intended application in desalination, some or all of the pump parts may be constructed in plastics materials. For example components on the wet side of the pump including the cylinder block, head, valve block, pistons and piston rods may be constructed from plastics. Many plastics may be suitable. In one example these parts could be made from acetal copolymer. Plastics can have advantages over metal parts in corrosion resistance and a reduction in mineral buildup. They also offer a reduction in manufacturing cost.

The crankshaft 124 may be driven by any suitable power plant, most commonly by an electric motor. The motor should be chosen according to the expected displacement and operating conditions of the pump (speed and pressure). In one specific example, for a pump intended to run at 42 RPM, delivering a flow of 7 LPM, at a pressure of 650 to 900 PSI, the motor could be a Leeson ¼ horsepower DC motor, running at a nominal 1680 RPM, with a 40:1 reduction gearbox, providing approximately 42 RPM and 230 lb-in of torque.

Figure 4:
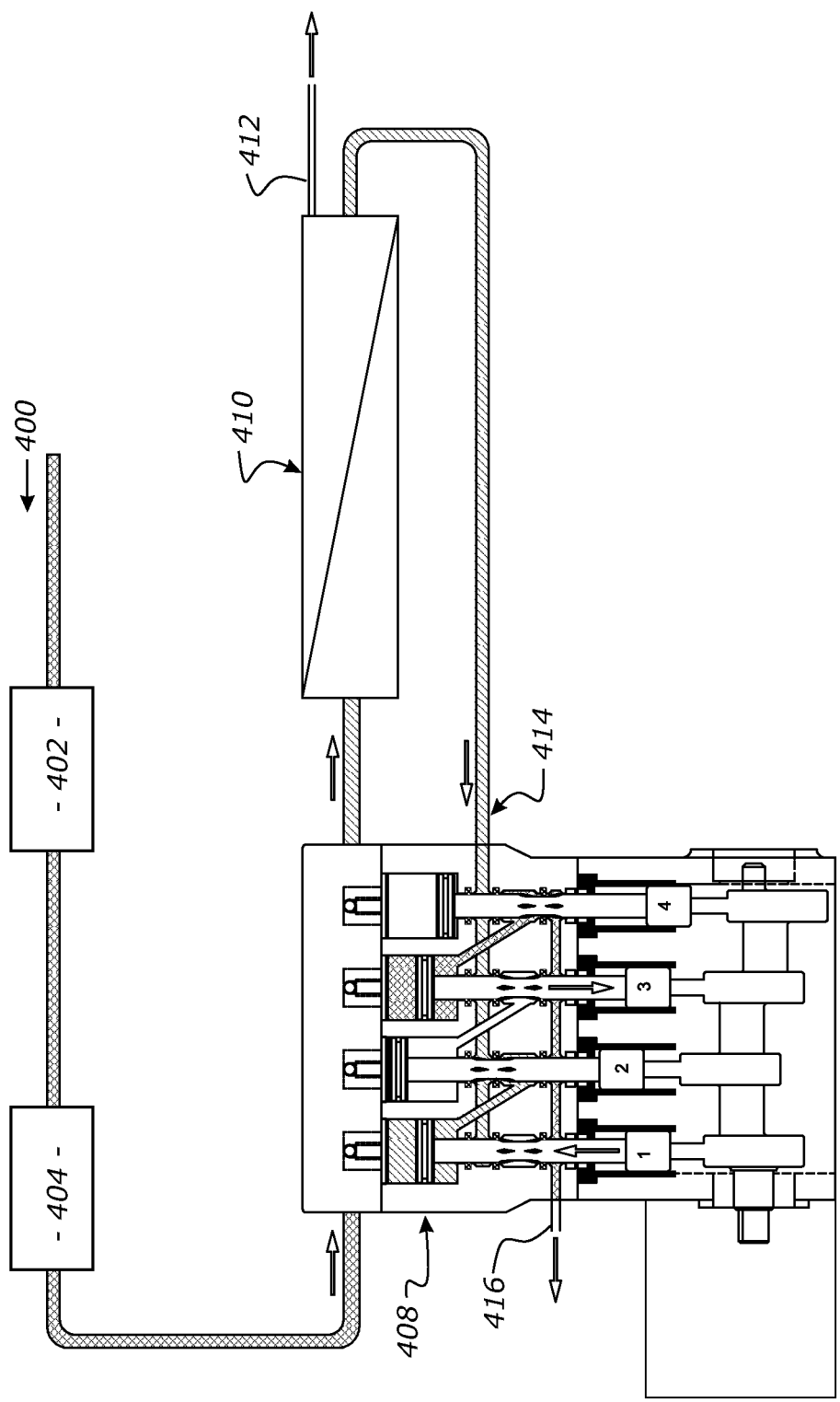
FIG. 4 is a schematic of a desalination system including a pump according to FIG. 1.

The described pump is particularly useful in desalination systems. Such a system is illustrated schematically in FIG. 4. In this system the feed pump is connected in series with other components. The system includes, in series, a booster pump 402 which is arranged to draw water from a water source. A conduit 403 connects the feed pump to a filter 404. A conduit 405 connects the filter 404 to the feed water inlet of feed pump 408. A conduit 407 connects the high pressure outlet of feed pump to the salt water inlet of a membrane unit 410. A conduit connects the concentrate outlet of membrane unit 410 to the recovery inlet of feed pump 408. A discharge conduit 411 leads from the discharge outlet of the feed pump to a suitable drain. A fresh water supply conduit 413 leads from the fresh water outlet of the membrane unit.

In a larger system some or all of the parts may be duplicated so that their efficient capacity may be matched, or to provide redundancy. The system may include valves or connections to allow parts to be independently replaced. For example, additional filters may be included in parallel with the filter 404 or a backup booster pump may be provided in parallel with pump 402. In a larger system, a single feed pump may supply multiple membrane units, multiple feed pumps may supply multiple membrane units or multiple feed pumps may supply a single membrane unit.

The booster pump may be any pump suitable for drawing the intended volume of liquid and supplying it at a low to moderate pressure, (for example 8 to 60 Psi; 50 to 410 kPa).

The filter may be chosen to suit other elements of the system, for example the maximum silt size for the membrane unit. For example a 5 micron filter may be suitable.

The membrane unit may be any of the many reverse osmosis membrane units now available. For example a membrane unit, or units, from the Dow Filmtec™ range. For example a Filmtec SW30-2540 would suit a system intended to supply 1000 to 2000 litres per day.

In this system an initial low pressure pump 402 draws saline water (typically sea water) from a source 400 and supplies it at a low pressure (for example 8b to 60 Psi) to a filter 404. The filter may be a 5 Micron filter, for example. The liquid then proceeds to the high pressure pump 408 which in turn supplies the membrane unit 410. The liquid is received by the pump 408 at an initial positive pressure that depends on the present performance of the filter 404. The pump 408 supplies liquid to the membrane unit. Some of the liquid supplied to the membrane unit is extracted as fresh water and exits the membrane unit at 412. The remainder is a high pressure concentrate which is returned to the pump 408 at 414. The pump 408 recovers energy from the high pressure concentrate, and discharges low pressure concentrate at 416.

The recovery side of the pump displaces less liquid per revolution than the supply side of the pump as the recovery side of the piston presents less area than the supply side. This difference in displacement corresponds to the recovery rate (the ratio of the volume of fresh water being delivered by the membrane unit to the volume of salt water delivered to the unit). The ratio of piston area on the feed chamber side of the piston to the piston area on the recovery chamber side of the piston is chosen according to the expected performance of the membrane unit. With careful selection, the speed of the pump is controlled to achieve a desired pressure at the membrane unit within the operating parameters of the membrane unit. This is the pressure and flow rate at which the unit extracts fresh water at a rate and efficiency to match the supply rate and recovery rate of the pump.

For example, if the feed pump has a cylinder bore of 41 mm and a piston rod diameter of 15 mm, the intended recovery rate is 13%. If this pump has a stroke of 30 mm and is run at 42 RPM the total flow delivered to the membrane unit is expected to be 7 LPM. If the membrane unit is a SW30-2540, this flow rate and a forced recovery rate of 13% will usually result in an operating pressure of 650-900 psi, although the operating pressure will vary due operating conditions including salinity levels, fluid temperature and membrane condition.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

In addition, where features or aspects of the invention are described in terms of Markush groups, those skilled in the art will recognise that the invention is also thereby described in terms of any individual member or subgroup of members of the Markush group.

The invention claimed is:

1. A pump comprising: four cylinders, a double acting piston in each cylinder, thereby defining a feed chamber and a recovery chamber, all connected to a common drive by a connection, wherein there is no lost motion mechanism associated with each piston, the connection to the common drive being such that pistons reciprocate in a sequence equally spaced in time, valving for each piston driven by the common drive to be 90 degrees out of phase with the respective piston, the valving being such as to connect the recovery chamber alternately to an inlet manifold for an intake stroke of the piston relative to the recovery chamber, and to an outlet manifold for a discharge stroke of the piston relative to the recovery chamber, with a brief period of closure coinciding with top dead centre and bottom dead centre of the piston, during which the recovery chamber is blocked off from both the inlet and outlet manifolds, the valving being midway between its top dead centre and bottom dead centre during the period of closure.

2. The pump as claimed in claim 1 wherein the connection includes a piston rod extending from each piston and reciprocating with the respective piston, and the valving for each piston is operated by the reciprocating of the piston rod of another cylinder.

3. The pump as claimed in claim 2 wherein the connection includes a crankshaft and a connecting rod connecting between each piston rod and the crankshaft.

4. The pump as claimed in claim 2 wherein the valving for each piston comprises a spool or shuttle valve formed on the piston rod, cooperating with at least one inlet manifold port, at least one outlet manifold port and at least one recovery chamber port, to be in one of three conditions: connecting the inlet manifold port to the recovery chamber port, closing all three ports from one another, and connecting the outlet manifold port to the recovery chamber port.

5. The pump as claimed in claim 4 wherein the at least one inlet manifold port is located between the at least one recovery chamber port and the recovery chamber, and the reciprocation of each piston lags by 90 degrees the reciprocation of the piston rod which carries the valving for the respective piston of the aforesaid another cylinder.

6. The pump as claimed in claim 2 wherein the connection includes a crankshaft and a connecting rod connecting between each piston rod and the crankshaft.

7. The pump as claimed in claim 2 wherein the valving for each piston comprises a spool or shuttle valve formed on the piston rod, cooperating with ports for each of the inlet manifold, the outlet manifold and the recovery chamber, to be in one of three conditions: connecting the inlet manifold port to the recovery chamber port, closing all three ports from one another, and connecting the outlet manifold port to the recovery chamber port.

8. The pump as claimed in claim 7, wherein the piston rod is shaped to have a region that forms a flow path when the region is brought into alignment with either the inlet manifold port and the recovery chamber port or the outlet manifold port and the recovery chamber port.

9. The pump as claimed in claim 8, wherein the piston rod is shaped to have a region that forms a flow path, either taken alone or in conjunction with a journal, when the region is brought into alignment with either the inlet manifold port and the recovery chamber port or the outlet manifold port and the recovery chamber port.

10. The pump as claimed in claim 8, wherein the region is of reduced radius or of longitudinal grooves.

11. The pump as claimed in claim 1 wherein the cylinders, the pistons and the valving are formed from plastics material.

12. A desalination system for desalinating sea water, the system including a supply pump drawing a supply of raw sea water, a filter receiving raw feed water from the supply pump, a feed pump receiving filtered sea water from the filter, a membrane unit receiving filtered sea water at high pressure from the feed pump, and discharging fresh water at one outlet and a high pressure concentrate at another outlet, the feed pump receiving the high pressure concentrate, applying energy from the high pressure concentrate to pumping the filtered sea water, and discharging lower pressure concentrate, the feed pump comprising: four cylinders, a double acting piston in each cylinder, thereby defining a feed chamber and a recovery chamber, all connected to a common drive by a connection, wherein there is no lost motion mechanism associated with each piston, the connection to the common drive being such that the pistons reciprocate in a sequence equally spaced in time, valving for each piston driven by the common drive to be 90 degrees out of phase with the respective piston, the valving being such as to connect the recovery chamber alternately to an inlet manifold for an intake stroke of the piston relative to the recovery chamber, and to an outlet manifold for a discharge stroke of the piston relative to the recovery chamber, with a brief period of closure coinciding with top dead centre and bottom dead centre of the piston, during which the recovery chamber is blocked off from both the inlet and outlet manifolds, the valving being midway between its top dead centre and bottom dead centre during the period of closure.

13. The desalination system as claimed in claim 12 wherein the connection includes a piston rod extending from each piston and reciprocating with the respective piston, and the valving for each cylinder is operated by the reciprocating of the piston rod of another cylinder.

14. The desalination system as claimed in claim 13 wherein the connection includes a crankshaft and a connecting rod connecting between each piston rod and the crankshaft.

15. The desalination system as claimed in claim 13 wherein the valving for each cylinder comprises a spool or shuttle valve formed on the piston rod, cooperating with ports for at least one inlet manifold port, at least one outlet manifold port and at least one recovery chamber port, to be in one of three conditions: connecting the inlet manifold port to the recovery chamber port, closing all three ports from one another, and connecting the outlet manifold port to the recovery chamber port.

16. The desalination system as claimed in claim 15 wherein the inlet manifold ports are between the recovery chamber ports and the recovery chamber, and the reciprocation of each piston lags by 90 degrees the reciprocation of the piston rod which carries the valving for the respective piston of the aforesaid another cylinder.

17. The desalination system as claimed in claim 12 wherein the cylinders, the pistons and the valving are formed from plastics material.

18. The desalination system as claimed in claim 13 wherein the connection includes a crankshaft and a connecting rod connecting between each piston rod and the crankshaft.

19. The desalination system as claimed in claim 13 wherein the valving for each piston comprises a spool or shuttle valve formed on the piston rod, cooperating with ports for each of the inlet manifold, the outlet manifold and the recovery chamber, to be in one of three conditions: connecting the inlet manifold port to the recovery chamber port, closing all three ports from one another, and connecting the outlet manifold port to the recovery chamber port.

* * * * *